May 15, 1923.

S. OLSON

SHOCK LOADER

Filed March 31, 1921

INVENTOR
Swan Olson
BY HIS ATTORNEY
James F. Williamson

May 15, 1923.  
S. OLSON  
SHOCK LOADER  
Filed March 31, 1921  
1,455,029  
4 Sheets-Sheet 2

INVENTOR  
Swan Olson  
BY HIS ATTORNEY  
James F. Williamson

May 15, 1923.
S. OLSON
SHOCK LOADER
Filed March 31, 1921
1,455,029
4 Sheets-Sheet 3
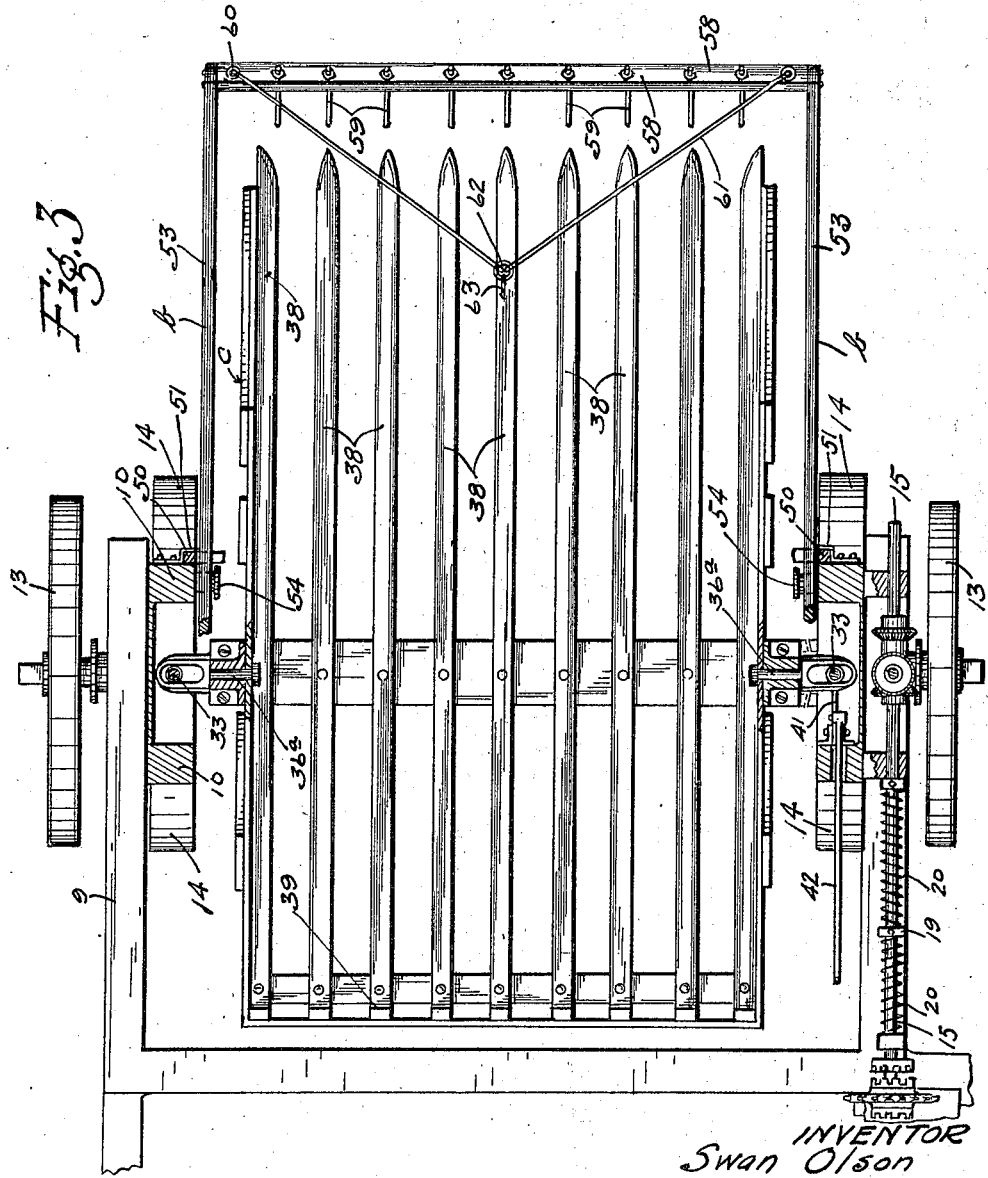
INVENTOR
Swan Olson
BY HIS ATTORNEY
James F. Williamson

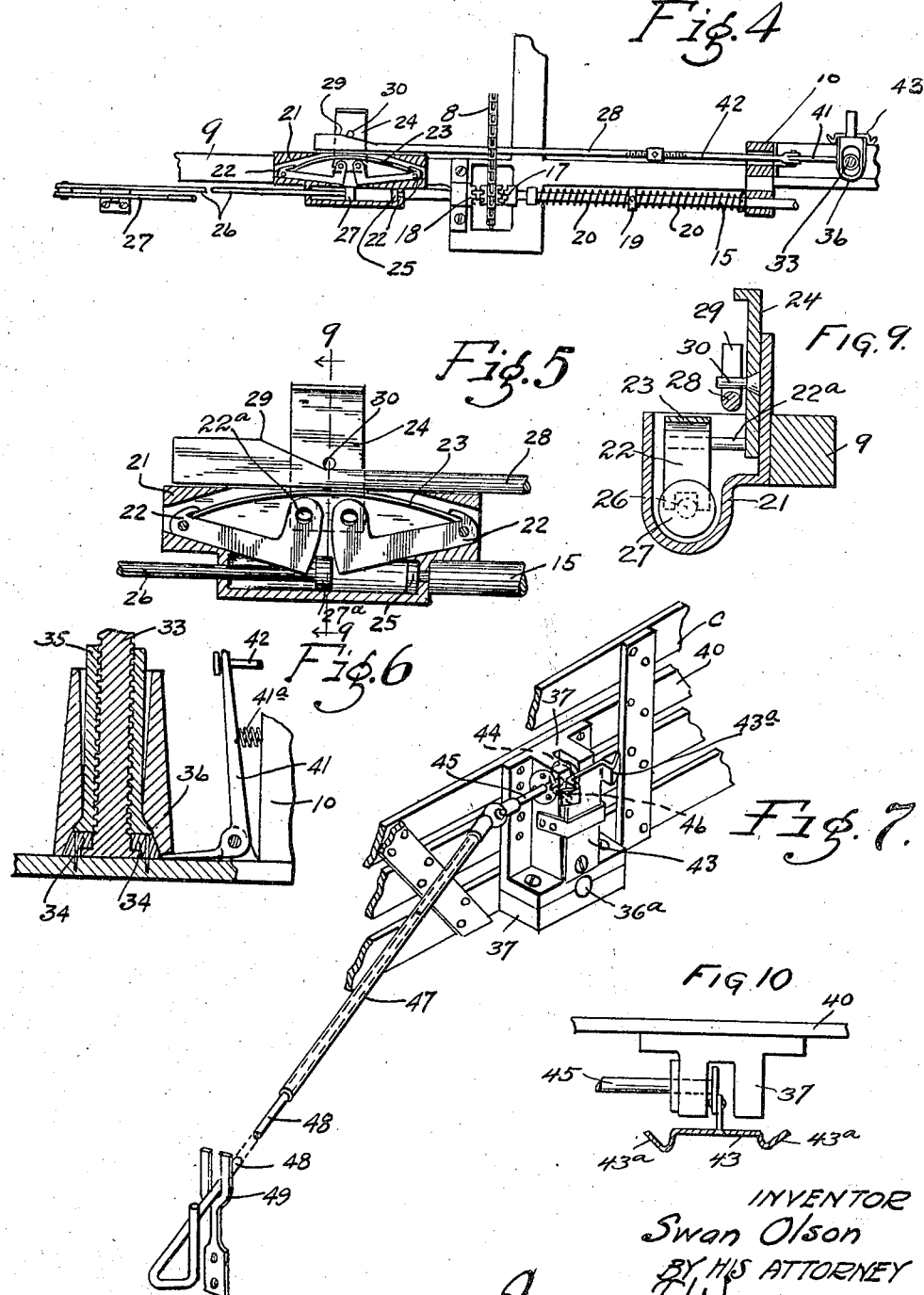

Patented May 15, 1923.

1,455,029

UNITED STATES PATENT OFFICE.

SWAN OLSON, OF MINNEAPOLIS, MINNESOTA.

SHOCK LOADER.

Application filed March 31, 1921. Serial No. 457,301.

*To all whom it may concern:*

Be it known that I, SWAN OLSON, a citizen of the United States, residing at Minneapolis, in the county of Hennepin and State of Minnesota, have invented certain new and useful Improvements in Shock Loaders; and I do hereby declare the following to be a full, clear, and exact description of the invention, such as will enable others skilled in the art to which it appertains to make and use the same.

This invention relates to a hay or shock loader and is of the type in which the hay or other material is gathered from the ground, elevated and deposited on a vehicle.

It is an object of this invention to provide such a loader which can be readily operated by a farm tractor, both for its locomotive movement and for its various movements in performing the loading operation.

It is a further object of the invention to provide such a loader having a carrier adapted to be raised and lowered and a power driven rake which will move the material onto the carrier when the carrier is in its lowered position.

It is another object of the invention to provide such a carrier with power elevating and lowering mechanism and with means whereby such power mechanism will be automatically thrown out of operation when the carrier reaches its lowered position.

It is a further object of the invention to so construct the carrier that the same will be automatically dumped by the power mechanism but so that the same can also be dumped at any time desired by manual means.

A still further object of the invention is to have the mechanism for performing the different movements of the device all under control of the operator by means disposed at the rear of the tractor within easy reach of the operator when occupying the usual seat for driving the tractor.

These and other objects and advantages of the invention will be apparent from the following description made in connection with the accompanying drawings in which like reference characters refer to the same parts throughout the different views, and in which Fig. 1 is a view in side elevation of the device;

Fig. 3 is a horizontal sectional plan taken on the line 3—3 of Fig. 1;

Fig. 4 is a sectional view showing the details of the carrier clutch mechanism;

Fig. 5 is a section showing a detail of such clutch mechanism;

Fig. 6 is a detail view partly in section, showing the operating mechanism for the carrier clutch device;

Fig. 7 is a perspective view showing a portion of the manual dumping mechanism for the carrier;

Fig. 9 is a view in vertical section taken on the line 9—9 of Fig. 5; and

Fig. 10 is a horizontal section taken substantially on the line 10—10 of Fig. 2.

Figure 1:
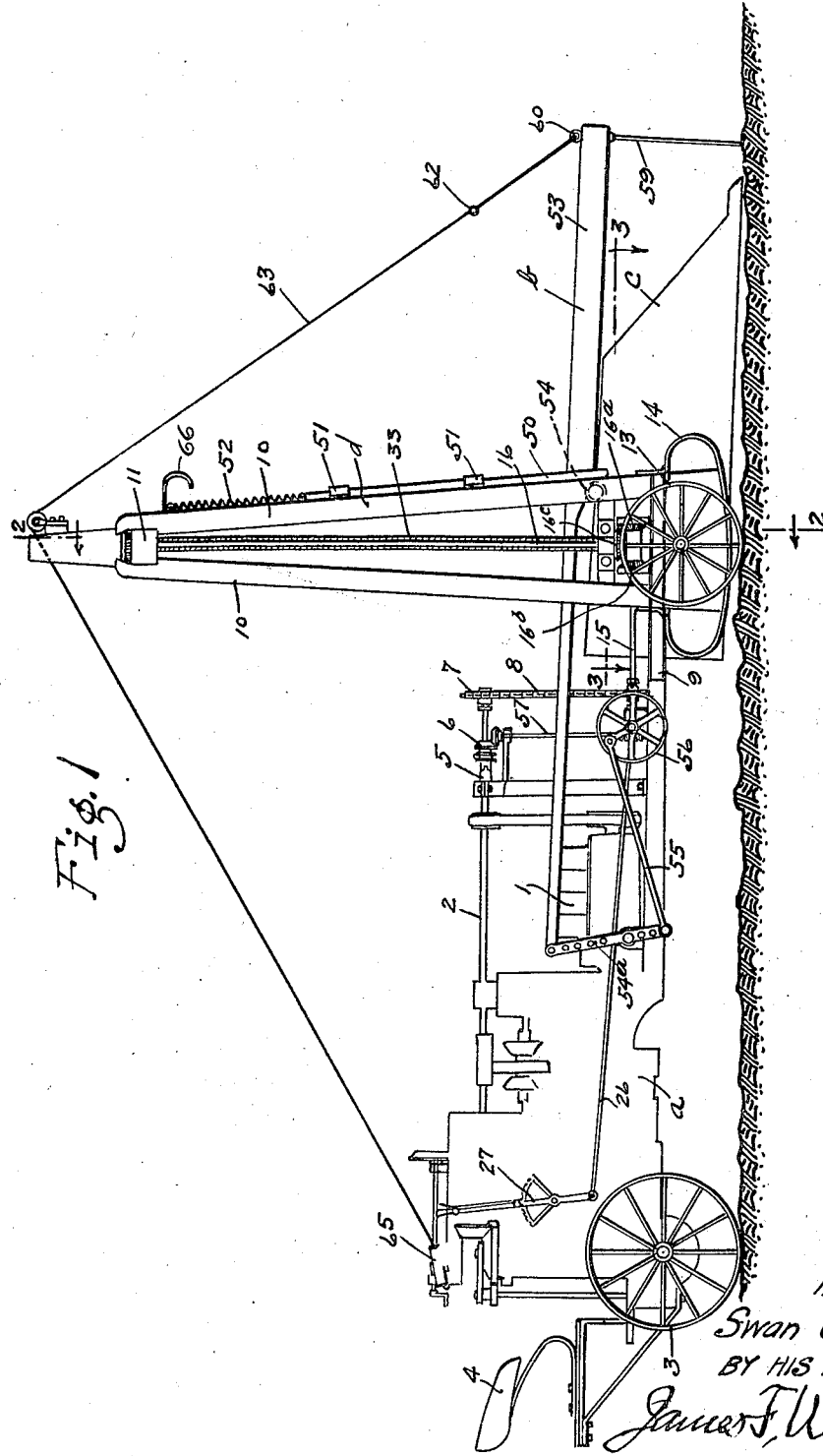

Referring to the drawings, as shown in Fig. 1, the loader comprises a tractor portion *a*, the rake portion *b*, the carrier *c*, and the elevating and supporting mechanism *d* for the carrier *c*.

Figure 2:
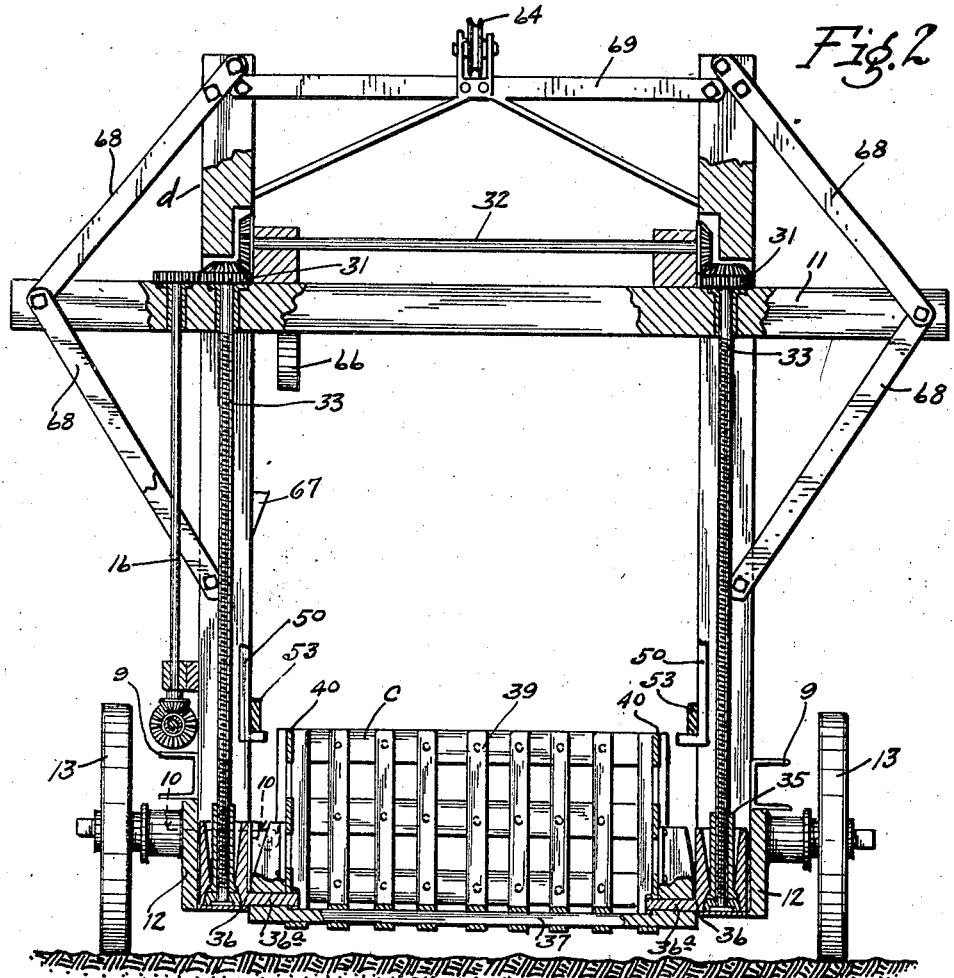
Fig. 2 is a central vertical section taken on the line 2—2 of Fig. 1.

The tractor *a* can be of any standard or usual type and, as disclosed, is of the type shown more specifically in my copending application S. N. 445,839 filed February 17, 1921, and entitled Push harvester binder. The tractor comprises the engine 1, the usual transmission mechanism and transmission shaft 2, the supporting wheels 3 and seat 4. In accordance with the present invention, the transmission shaft 2 is carried forwardly and provided with a clutch 5, driving beveled gears 6 and a driving sprocket 7 over which a chain 8 is arranged to travel. Spaced side frame members 9 are provided for supporting the loading device and these are connected at their rear ends to the tractor frame in any desired manner. At their forward portions, the frame members 9 have securely bolted thereto, spaced upright members 10. These members rise at each side of the device and are connected at their upper ends by a transverse beam 11. At the lower portion of members 10 are disposed members 12 securely fastened thereto and provided with outwardly extending bearings adapted to receive axles for supporting the wheels 13. Secured to the front and rear sides of the frame formed by the members 10 are bow runner members 14 which extend under said frame members into close proximity with the ground at each side of the machine. In case uneven portions of the ground are encountered or some slight obstruction or pile of grass or refuse, the device will be assisted in moving thereover by the support of runners 14. A shaft 15 extends along one side of the frame and has a slidably mounted sleeve thereon carrying a sprocket wheel 15$^b$ adapted to receive thereover the chain 8. This shaft, as shown in Figs. 1 and 3, carries at its front end a pair of oppositely facing beveled gears 16$^a$ and 16$^b$ which are adapted to mesh alternately with the beveled gear 16$^c$ on the lower end of a shaft 16 extending upwardly at one side of the machine, as shown in Fig. 2, this shaft being supported in suitable brackets carried by the members 10 and in a bearing disposed in the member 11. The shaft 15 is also provided with clutch members 17 and 18, which, as shown in Fig. 4, are disposed at either side of a clutch member carried on the sprocket over which runs the chain 8. The shaft 15 also carries a collar 19 secured thereto by a set screw or other convenient means and springs 20 are disposed between this collar and the clutch 17 and between the collar and a bearing projecting from the side of the frame member 9 through which the shaft 15 passes. The shaft 15 is adapted to be moved longitudinally to engage the clutches 17 and 18 and to engage the beveled gears at the front end thereof with a beveled gear carried at the lower end of the shaft 16. At its end, a shifting member 21 is provided which is movably mounted on the frame members 9. This member is of box-like form and has mounted therein two reversely facing L-shaped members 22. The long ends of these members are pivoted at the outer ends of the member 21 and provided with hook-like portions which engage over a leaf spring 23 held therein and which tends to maintain the members in the position shown in Fig. 5. The short legs of the member which are adjacent each other are apertured to receive pivot pins 22$^a$ extending through the member 21 and secured in a plate member 24 disposed at one side of the member 21 and projecting thereabove. The shaft 15 extends to the member 21 and is connected thereto by a headed member 25, a small portion of which projects through the end of member 21 and is connected to the shaft 15. The headed member 25 is disposed in a bore or cylindrical passage in the lower portion of the member 21 and this passage is also apertured at the other end of the member 21 to receive a rod 26 having a head 27$^a$ on the end thereof. This rod 26 extends rearwardly along the side of the tractor and is adapted to be reciprocated by a lever member 27 equipped with the usual spring pawl handle and toothed quadrant therefor, which lever is disposed within convenient reach of the operator. A reciprocation of the member 26 brings the member 27$^a$ into contact with one end of the member 21 or with the member 25 in the other end thereof and thus moves the said members together with the shaft 15 in either direction. A rod 28 extends longitudinally of the member 21 adjacent the top portion thereof and has a cam portion 29 on one end adapted to cooperate with the pin 30 projecting from the plate 24 for a purpose to be later described.

The shaft 16 above referred to carries at its upper end adjacent the member 11 a spur gear which meshes with a combined spur and beveled gear 31, which, in turn, meshes with the beveled gear on the end of a horizontal shaft 32. This shaft is equipped with a similar beveled gear at its outer end which meshes with another beveled gear attached to a vertical screw 33. This screw is similar to the screw 33 secured to the first mentioned beveled gear 31 and both screws are journaled in bearings in the member 11 and extend down centrally between the members 10 and are provided at their lower ends with collars or shoulders adapted to rotate and be held in bearings 34 secured in the frame at the lower portion of the members 10. The screws 33 are engaged with elongated nuts 35 which are provided at their lower ends with projecting conical portions adapted to be received in conical portions in members 36, the members 36, above the said conical portions being formed with upwardly diverging chambers surrounding the nuts 35. This construction permits a swiveled action of the members 36 about the nuts 35. The members 36 are provided with inwardly extending journal members 36$^a$ which are received in bearings formed on the main supporting member 37 of the cradle or carrier c. This carrier comprises longitudinally extended spaced pointed slats 38, vertically extending and spaced slats 39 at the rear thereof aligned with the slats 38, and spaced horizontally extending slats 40 of greater width which pass around the rear and sides of the carrier. The general shape of the carrier in side elevation is shown in Fig. 1. From the description given, it is seen that the carrier is pivotally mounted on the members 36, which members, as stated, have a slight swiveling movement on the nuts 35 but will be carried vertically by said nuts when the same are caused to traverse the screws 33 by the rotation of the latter.

A bell crank lever 41 is pivoted at one side of the member 36 shown at the left of Fig. 2 and the short arm of this lever is adapted to be contacted by said member when the same is in its lowermost position. This lever is normally held with the short arm elevated by a tension spring 41$^a$. The long arm of lever 41 extends upwardly and receives in its bifurcated end the headed end of a rod 42. This rod is connected by a turn buckle of ordinary type, to the rod 28, heretofore referred to. The member 37 at one side of the machine, as shown at the left hand side of Fig. 2, is provided with a spring plate 43 which is secured in contact therewith at its lower end but spaced therefrom at its upper end. The member 43 is provided with outwardly and rearwardly extending arms 43ª at its upper portion, which are adapted to be disposed at each side of the member 36. The plate 43 is further held in position by a band passing around its intermediate portion and secured at the sides of the upstanding portion of member 37. This portion of member 37 is formed with a vertical slot and a disk member 44 is located in this slot and carried on the shaft 45 extending through the side of the upstanding portion of member 37. The disk member 44 is provided with a pin acting as a cam pin to which is connected a short link 46, the outer end of which extends through the plate 43 and is formed with a rivet head. With this construction it will be seen that when the shaft 45 is turned the link 46 will be moved so that the plate 43 is drawn into contact with the member 37 at its upper portion. The shaft 45 is connected by a universal joint to a sleeve 47 from which a rod 48 extends through suitable guides 49 to a position within convenient reach of the operator seated on the seat 4 of the tractor. It may be stated that when the member 43 is thus moved to bring its upper end into contact with the member 37, the arms 43ª will be withdrawn from engagement with the member 36.

The material is adapted to be moved onto the carrier c by the rake b. This member comprises longitudinal side members 53 which are supported on pins 54 projecting inwardly of the front members 10, which pins are provided with retaining collars on their inner ends. The members 53 extend to the rear of members 10 and are pivotally connected at their rear ends to a lever 54ª, which lever is intermediately pivoted to brackets supported on the frame members 9. The lever 54ª, at the other side of its pivot is connected by a pitman 55 to a crank wheel 56. The crank wheel 56 is secured to a shaft extending transversely of the frame members 9 and supported in suitable brackets thereon and is rotated by a worm wheel thereon in engagement with the worm carried on shaft 57, which shaft is driven from the main transmission shaft 2 through the beveled gears 6. The members 53 are wider at their front than at their rear ends and are formed with an inclined cam surface on their under portions adjacent the pins 54. The lever 54ª is provided with a plurality of holes at each side of its pivot adapted to receive the members b and 55 in various adjustments. The rake b, at its front end has a cross bar 58 connecting the members 53 from which project downwardly spaced teeth formed as rods 59 passing through and secured at their upper ends to the cross bar 58 by suitable nuts. At each end of the bar 58 a screw eye 60 is located and rods 61 are connected thereto and to a ring member 62. A cable member 63 is connected to the ring 62 at one end and passes over a sheave 64 supported centrally at the top of the frame and from this sheave downwardly to a tension take-up device 65 located at the upper and rear portion of the tractor frame.

The rake b is also supported by rods 50 having projections extending under each side thereof. These rods are arranged to move in guide members 51 secured to the sides of members 10. The rods 50 are connected at their upper ends to a comparatively strong coiled spring 52 anchored near the top of the same member 10. These springs are so arranged that they will be distended when the rake b is in its lowest position and will be of such strength that they will support the rake with its front end substantially in contact with the ground and thus act as counterweighting devices to maintain the rake in correct poise.

A member 66 in the form of a downturned leaf spring extends forwardly from the under surface of member 11 at one side thereof and downwardly inclined wedge-shaped members 67 are disposed on the inner side of member 10 at one side of the machine somewhat below the lower side of member 66. The ends of member 11 project at each side of the members 10 and brace members 68 are bolted to the ends thereof and to the upper and lower portion of the members 10 and a cross member 69 connects these upper portions of members 10.

The operation of the device is as follows:

The machine will be projected along the ground with the carrier c in its lowermost position. The clutch 5 will be engaged with gears 6 to drive the wheel 56 and oscillate the lever 54ª. This will move the side members 53 of the rake b back and forward and the front end of the rake will be raised and lowered by the cam portion thereof moving past the pins 54. This motion will be somewhat augmented by the movement of the upper end of the lever 54ª. It will thus be seen that the ends of the teeth 59 will travel in a closed elliptical path and will move the material onto the carrier c. For moving a shock onto carrier c, the operator will raise rake b by pulling on cable 63, and coordinating this movement with the rearward power movement of the rake. The rake will be dropped in front of the shock and the same will be moved onto carrier c. When sufficient material has accumulated thereon the operator will manipulate lever 27 and move the shift member 21 and shaft 15 to engage the beveled gears 16$^b$ and 16$^c$ and the sprocket 15$^b$ and clutch member 18 so that the screws 33 will be turned in the direction to elevate the nuts 35. The nuts will carry the members 36 upwardly therewith and the carrier c will be elevated by the pivots 36$^a$ engaging member 37. The carrier will move upwardly in substantially horizontal position, the plate 43 holding the same in this position by engagement with the sides of members 36. The rake b is also elevated at this time by the engagement of member 37 with the side members 53 thereof. The rake being poised by the springs 52 will not require much power to elevate it. When the carrier has approached the upper limit of its movement its rear end will engage with the spring member 66. Just previous to this engagement the extended portions 43$^a$ of plate 43 will engage with the wedge members 67 the position of which is indicated in Fig. 2 and in dotted lines in Fig. 3 and the plate 43 will be moved inwardly and out of contact with the member 36. The carrier c is therefore free to swing forwardly on its pivots and will be caused to swing by further upward movement since it is in engagement with the member 66. The hay in the carrier will thus be discharged and can be received onto a vehicle disposed in position to receive the same.

If the operator wishes to dump the material on the carrier c before the carrier reaches its uppermost position, he can do so at any time by turning the rod 48. This rod is provided with a convenient upturned portion at its rear end by which it may be given a rotating movement. Such movement will, in turn, turn the shaft 45 and the plate 43 will be drawn inwardly to disengage the upstanding end of the member 36. The carriage will then swing downwardly on its pivots and the material therein will be discharged.

After the carriage has been raised to discharging position, the lever 27 will be moved to neutral position with clutches 17 and 18 and gears 16$^a$, 16$^b$ and 16$^c$ disengaged. When it is desired to lower the carrier the lever will be manipulated to move the shift member 21 to engage the clutch 17, and sprockets 15$^b$, as well as gears 16$^a$ and 16$^c$. This will rotate the screws 33 in a direction to lower the carrier. When the carrier reaches its lowermost position, the lower end of the member 36 will contact the lever 41, which lever will be swung and move the rods 42 and 28 longitudinally. This movement will move the inclined portion of the member 29 under pin 30 and the member 24 will thus be raised carrying with it the short inner arms of the members 22. It will be noted that the head 27$^a$ on the rod 26 is located between the inner ends of the members 22 and the shift member 21 is thus held from movement in respect to the pressure of springs 20, one of which is compressed when the carrier is being lowered. When the members 22 are raised the head 27$^a$ is released and the springs 20 then act to move the member 21 through the connection 25 to bring the clutches 17 and 18 and gears 16$^a$ and 16$^b$ into disengagement or neutral position. The screws 33 are therefore stopped and the carrier rests on its lowermost position.

The take-up or tension device 65 as well as springs 52 acts to counterbalance the rake member b and it will also be noted that this rake member can be raised at any time desired by the operator grasping the cable 63 and pulling the same over the sheave 64.

Figure 8:
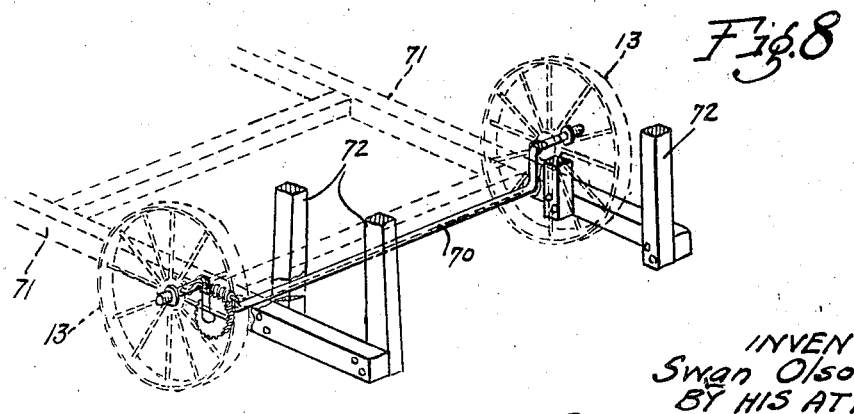
Fig. 8 is a modified form of the supporting device for the loader.

In Fig. 8, is illustrated another method of supporting the loader by the wheels 13. Instead of having the members 12 carry the axle bearing and stub axles therein, one continuous axle 70 can be used which will be dropped sufficiently at its central portion to pass under the carrier c. The frame members 71 will correspond to the frame members 9 and the members 72 to the members 10. The structure of the device otherwise will be the same as already described.

From the above description it is seen that applicant has provided a simple and efficient loading device and one which can be quickly and easily controlled and operated by the person who also drives the tractor.

It will, of course, be understood that various changes may be made in the form, details and arrangement of the device without departing from the scope of applicant's invention, which, generally stated, consists in the matter shown and described and set forth in the appended claims.

What is claimed is:

1. A shock loading device comprising, a frame, a carrier, means for elevating and lowering said carrier in said frame, means for swinging said carrier about a horizontal transverse axis when elevated in said frame, and a rake member co-operating with said carrier, and independent means, respectively, for moving said rake to place the material on said carrier and for elevating said rake.

2. A loading device adapted to be connected to and operated by a tractor comprising a pivoted carrier adapted to be raised and lowered, an oscillating rake member adapted to move the material onto said carrier, and lever and cam means for operating said rake member to move the end thereof in a closed elliptical path.

3. A shock loading device comprising a frame, a pivoted carrier mounted thereon, a rake member co-operating with and moving independently of said carrier, means for bodily raising said carrier, means for swinging the same on its pivot after being raised, and means for operating said rake.

4. A loading device having in combination a truck supported frame adapted to be connected at its rear end to a tractor, a pivoted carrier mounted thereon adapted to be raised and lowered, a rake member carried thereby for moving the material onto said carrier, and bow runner members at each side of the frame adjacent the truck wheels.

5. A loading device comprising a frame adapted to be connected at its rear end to a tractor, a pivoted carrier mounted on said frame and adapted to be raised and lowered thereon, power means connecting the tractor for raising and lowering said carrier, and means for automatically rendering said power means inoperative when the carrier reaches its lowermost position.

6. A shock loading device comprising a frame adapted to be connected at its rear end to a tractor, spaced upright members on said frame, a carrier movable vertically between said members and about an axis extending between said members, means for holding said carrier against swinging movement when the same is raised, means adjacent the top of said upright members for rendering said last means inoperative, and means for effecting swinging movement of the carrier to discharging position when the same is raised to the top of said upright members.

7. A loading device comprising a frame adapted to be connected at its rear end to a tractor, a carrier mounted on substantially horizontal pivots, means mounted on said frame and adapted to be raised and lowered thereon carrying said pivots, means for holding said carrier against swinging movement, and manual means for rendering the last named means inoperative to permit the carrier to swing to discharging position at any portion of its upward movement.

8. A portable shock loading device adapted to be connected to, moved, and operated by a tractor comprising, an upright frame having spaced members, a carrier pivoted on trunnions reciprocable vertically in said members, an oscillating rake member adapted to move the material onto said carrier, means adapted to be operated by power for raising and lowering said carrier, means adapted to be operated by power for operating said rake manually operated means for permitting swinging movement of said carrier, and manually operated means for raising said rake.

9. A loading device comprising a frame, a pivoted carrier mounted therein and adapted to be raised and lowered, a rake member adapted to be oscillated to move the material onto said carrier, and tension means connected to said rake member to counterbalance the same.

10. The structure set forth in claim 9, said last mentioned means including a cable attached to the front of said rake member and passing over a sheave on the top of the frame and to the rear of the machine within convenient reach of the operator so that the cable may be pulled at any time to raise the rake member.

11. A loading device comprising a frame having longitudinal side members adapted to be connected at the rear ends to a tractor, upright standards at each side of the frame connected at their upper ends by cross members, a carrier mounted between said standards, elevating screws mounted between the standards at each side of said frame, nut members engaged with the screws, and means swivelly carried by said nut to which said carrier is pivoted.

12. The structure set forth in claim 11, and reversible power means adapted to be connected and disconnected from the tractor for rotating said screws to raise and lower the carrier.

In testimony whereof I affix my signature.

SWAN OLSON.